(12) United States Patent
Tamura et al.

(10) Patent No.: US 10,854,081 B2
(45) Date of Patent: Dec. 1, 2020

(54) DRIVING ASSISTANCE DEVICE AND DRIVING ASSISTANCE METHOD

(71) Applicants: DENSO CORPORATION, Kariya (JP); TOYOTA JIDOSHA KABUSHIKI KAISHA, Toyota (JP)

(72) Inventors: Kei Tamura, Kariya (JP); Yosuke Ito, Kariya (JP); Toru Takahashi, Kariya (JP); Masayasu Tanase, Toyota (JP); Wataru Ike, Toyota (JP)

(73) Assignees: DENSO CORPORATION, Kariya (JP); TOYOTA JIDOSHA KABUSHIKI KAISHA, Toyota ( * ) Notice: Subject to any disclaimer, the term of this patent is extended or adjusted under 35 U.S.C. 154(b) by 234 days.

(21) Appl. No.: 16/064,668

(22) PCT Filed: Dec. 18, 2016

(86) PCT No.: PCT/JP2016/087696
§ 371 (c)(1),
(2) Date: Jun. 21, 2018

(87) PCT Pub. No.: WO2017/110703
PCT Pub. Date: Jun. 29, 2017

(65) Prior Publication Data
US 2019/0012920 A1  Jan. 10, 2019

(30) Foreign Application Priority Data
Dec. 25, 2015  (JP) .................................. 2015-254470

(51) Int. Cl.
*G08G 1/16* (2006.01)
*B60W 50/14* (2020.01)
(Continued)

(52) U.S. Cl.
CPC .............. *G08G 1/166* (2013.01); *B60W 30/08* (2013.01); *B60W 30/09* (2013.01); *B60W 50/14* (2013.01);
(Continued)

(58) Field of Classification Search
CPC ...... G08G 1/166; B60W 30/08; B60W 50/14; B60W 30/09; B60W 2554/00;
(Continued)

(56) References Cited

U.S. PATENT DOCUMENTS 8,155,856 B2 *  4/2012  Sekiguchi .............. G08G 1/167
                                                           701/96
8,199,046 B2 *  6/2012  Nanami ................ G01S 13/867
                                                           342/52
(Continued)

FOREIGN PATENT DOCUMENTS

JP        2010-015450      1/2010
WO    WO 2013/111288      8/2013

*Primary Examiner* — Frederick M Brushaber
(74) *Attorney, Agent, or Firm* — Maschoff Brennan (57) ABSTRACT

A driving assistance device sets, in front of an own vehicle, an actuation region that is a region sandwiched by boundary lines, positioned at left and right, respectively. In a case where a target existing around the own vehicle has entered the actuation region, the device performs driving assistance for avoiding collision with the target or mitigating collision damage. The device, when setting the actuation region, in a case where the own vehicle is in a turning state, changes a lateral position of a boundary line in an outside in a turning direction of the own vehicle, of the left and right boundary lines of the actuation region, to a position closer to the own vehicle according to turning information. For a boundary line in an inside in a turning direction of the own vehicle, the device does not change a lateral position according to the turning information.

8 Claims, 4 Drawing Sheets

(51) Int. Cl.
*B60W 30/08* (2012.01)
*B60W 30/09* (2012.01)

(52) U.S. Cl.
CPC ... *B60W 2050/146* (2013.01); *B60W 2520/14* (2013.01); *B60W 2540/10* (2013.01); *B60W 2540/12* (2013.01); *B60W 2540/18* (2013.01); *B60W 2554/00* (2020.02)

(58) Field of Classification Search
CPC ......... B60W 2520/14; B60W 2540/12; B60W 2540/10; B60W 2540/18; B60W 2050/146
See application file for complete search history.

(56) References Cited

U.S. PATENT DOCUMENTS

| | | | | |
|---|---|---|---|---|
| 8,380,426 B2* | 2/2013 | Konijnendijk | .... | B60W 30/0956 701/301 |
| 9,211,889 B1* | 12/2015 | Hoetzer | ................ | G01S 15/931 |
| 9,613,533 B2* | 4/2017 | Iwami | .................. | B60W 30/06 |
| 9,650,040 B2* | 5/2017 | Minemura | ............ | G01S 13/867 |
| 9,896,095 B2* | 2/2018 | Katoh | ................... | B60W 10/20 |
| 9,896,129 B2* | 2/2018 | Baek | ..................... | G01S 13/931 |
| 10,093,289 B2* | 10/2018 | Lee | ......................... | B60T 8/171 |
| 2011/0054783 A1* | 3/2011 | Kishikawa | ............ | G06F 16/29 701/533 |
| 2014/0309864 A1* | 10/2014 | Ricci | ................... | B60R 25/1004 701/36 |
| 2014/0336917 A1 | 11/2014 | Nanami | | |
| 2015/0109164 A1* | 4/2015 | Takaki | ...................... | G01S 7/41 342/27 |
| 2015/0183430 A1* | 7/2015 | Schwindt | .............. | B60W 30/09 701/23 |
| 2016/0167699 A1* | 6/2016 | Yamaguchi | ........... | B60W 50/04 701/41 |
| 2017/0341652 A1* | 11/2017 | Sugawara | .......... | G08G 1/09623 |
| 2018/0079408 A1 | 3/2018 | Takahashi et al. | | |
| 2018/0370544 A1* | 12/2018 | Kitagawa | ............... | G08G 1/167 |

* cited by examiner

DRIVING ASSISTANCE DEVICE AND DRIVING ASSISTANCE METHOD

CROSS-REFERENCE TO RELATED APPLICATION

This application is based on and claims the benefit of priority from earlier Japanese Patent Application No. 2015-254470 filed on Dec. 25, 2015, the disclosures of which is incorporated herein by reference.

TECHNICAL FIELD

The present disclosure relates to a driving assistance technique for avoiding collision between an own vehicle and an object, or mitigating collision damage.

BACKGROUND ART

As a safety system for avoiding collision between a vehicle and an obstacle existing around the vehicle or for mitigating collision damage, a PCS (Pre-Crash Safety System) has been developed. This system, when the obstacle existing in front of an own vehicle has entered an actuation region that is set in front of the own vehicle, issues an alarm to a driver of the own vehicle or actuates a braking device of the vehicle (for example, refer to Patent Literature 1 (PTL 1)).

PTL 1 discloses that when it is determined that the own vehicle is traveling on a curved road, actuation of the safety device is more likely to be prevented than when it is determined that it is not traveling on the curved road. With this, a technique disclosed in PTL 1 prevents unnecessary actuation of the safety device by recognizing a vehicle, a structural object, or the like, presenting on a lane opposite to the curved road as an obstacle having a possibility of colliding with the own vehicle.

CITATION LIST

Patent Literature

[PTL 1] JP 2010-15450 A

SUMMARY OF THE INVENTION

Technical Problem

In a case where the actuation region is reduced for preventing unnecessary actuation of the safety device, the safety device is harder to actuate for a target existing inside a turning direction of the own vehicle. As a result, it can be thought that even though there is a possibility of collision with the target, the safety device might not be actuated, or actuation delay could occur.

The present disclosure has an object to provide a driving assistance device and a driving assistance method which prevent driving assistance from being performed related to a target having no possibility of collision, and that can start driving assistance at an appropriate timing for a target having a possibility of collision.

Solution to Problem

One aspect of a technology of the present disclosure employs the following measure.

A driving assistance device (10) of the present disclosure includes a target recognition section (11) configured to recognize a target existing around an own vehicle, a region setting section (13) configured to set, in front of the own vehicle, a front region that is a region sandwiched by boundary lines positioned leftwards and rightwards of the own vehicle, respectively; and a control section (14) configured to perform driving assistance for avoiding collision between the own vehicle and the target or for mitigating collision damage, in a case where the target recognized by the target recognition section enters the front region. The region setting section, in a case where the own vehicle is in a turning state, performs a one-side control of reducing the front region by changing a lateral position of a boundary line in an outside in a turning direction of the own vehicle, of the left and right boundary lines of the front region, to a position closer to the own vehicle according to turning information that is information on the turning state of the own vehicle, and by not changing a lateral position of a boundary line in an inside in a turning direction of the own vehicle according to the turning information.

With the above configuration, in a case where the own vehicle is in a turning state, the positions of the left and right boundary lines of the front region set in front of the own vehicle are changed as follows in order to identify a target to be an object of the driving assistance (an object of actuation of the safety device). Specifically, a lateral position of a boundary line in an out-of-path direction of the own vehicle (outside in a turning direction), of the left and right boundary lines of the front region set in front of the own vehicle, is changed to a position closer to the own vehicle according to the turning information. In the driving assistance device of the present disclosure, with the above configuration, in a case where the own vehicle is in a turning state, the driving assistance is made less likely to be performed on a target existing outside in a turning direction (in the out-of-path direction) of the own vehicle. With this, in the driving assistance device, it is possible to prevent unnecessary driving assistance from being performed on a target having no possibility of collision (a target having a low risk of collision).

In addition, with the above configuration, for the left and right boundary lines of the front region, of a boundary line in a traveling direction (inside in the turning direction) of the own vehicle, change of a lateral position of the boundary line according to the turning information is not performed. In the driving assistance device of the present disclosure, with such a configuration, in a case where the own vehicle is in the turning state, the driving assistance is made more likely to be performed on a target existing inside in the turning direction (in the traveling direction) of the own vehicle. With this, in the driving assistance device of the present disclosure, it is possible to prevent delay in starting driving assistance for a target existing inside in the turning direction of the own vehicle. That is, in the driving assistance device of the present disclosure, it is possible to prevent driving assistance from being performed on a target having no possibility of collision (a lateral target that is likely to be subjected to unnecessary driving assistance), and to perform driving assistance at an appropriate timing on a target having a possibility of collision.

DESCRIPTION OF EMBODIMENTS

Embodiments of a driving assistance device as one aspect of a technology of the present disclosure will be described below with reference to drawings. Note that, between respective embodiments described below, portions identical or equivalent to each other will be indicated with the same labels in the drawings, and for portions having the same label, the same description thereof should be applied. A driving assistance device of the present embodiment is mounted to a vehicle, and detects a target existing around an own vehicle and executes driving assistance. With this, the driving assistance device of the present embodiment functions as a PCS system that performs various controls for avoiding collision between the own vehicle and the target or for mitigating collision damage.

A driving assistance device 10 is a computer including a CPU, a ROM, a RAM, an I/O unit, and the like. In the driving assistance device 10, the CPU executes a program installed in the ROM to realize each function shown in FIG. 1. The driving assistance device 10 is respectively connected to a radar device 21 and an imaging device 22 which are target detecting devices for detecting a target existing around the own vehicle. The driving assistance device 10 inputs detection information from these sensor devices.

The radar device 21 is, for example, a publicly known millimeter-wave radar that uses a high-frequency signal in a millimeter-wave band for transmission waves. The radar device 21 is provided at a front-end portion of the own vehicle, and detects a target existing in a region within a predetermined detection angle (predetermined detection region). The radar device 21 acquires a distance between the detected target and the own vehicle, a relative speed of the target relative to the own vehicle, and an orientation of the target, and transmits acquired information on the target to the driving assistance device 10. The imaging device 22 is, for example, a CCD camera, a CMOS image sensor, or a near-infrared camera. The imaging device 22 is mounted at a predetermined height at a center in a vehicle width direction of the vehicle, and images, from a bird's-eye view point, a region extending in a predetermined angle range toward the front of the vehicle (a predetermined capturing region) The imaging device 22 extracts a feature point indicating a presence of a target from the captured image, and transmits an extraction result of the feature point to the driving assistance device 10.

In addition, the vehicle is provided with various vehicle sensors 23 for detecting a traveling state of the own vehicle, for example, such as an accelerator sensor, a brake sensor, a steering sensor, a yaw rate sensor, and a vehicle speed sensor. The accelerator sensor detects an operation amount of an accelerator pedal. The brake sensor detects an operation amount of a brake pedal. A steering angle sensor (steering sensor) detects a steering angle of a steering wheel. The yaw rate sensor detects an angular speed (yaw rate) in a turning direction of the own vehicle. The vehicle speed sensor detects a vehicle speed of the own vehicle (hereinafter, referred to as an "own vehicle speed").

Figure 1:
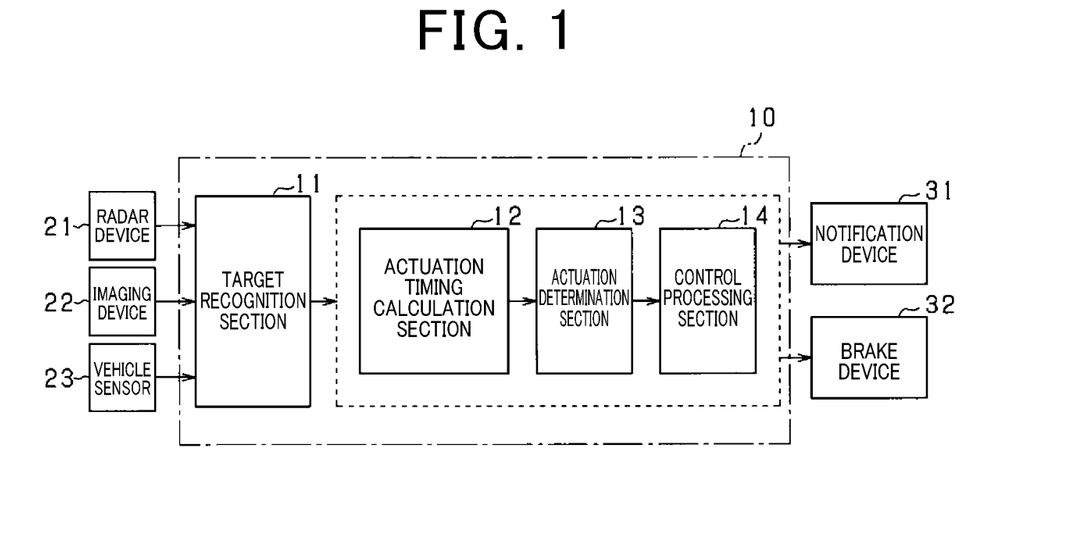
FIG. 1 is a block diagram showing a schematic configuration of a driving assistance device.

As shown in FIG. 1, the driving assistance device 10 includes a target recognition section 11, an actuation timing calculation section 12, an actuation determination section 13, and a control processing section 14.

The target recognition section 11 recognizes a target existing around the own vehicle. The target recognition section 11 acquires detection information of the target from the radar device 21 and the imaging device 22. The target recognition section 11 uses position information of the target acquired from the radar device 21 and position information of the target acquired from the imaging device 22 to recognize that the target exists at the position. Further, the target recognition section 11 associates a relative position with a relative speed, of the target relative to the own vehicle, for each target. Based on the relative position and relative speed associated with each other, the target recognition section 11 calculates a lateral speed that is a relative speed of the own vehicle in a direction orthogonal to the traveling direction and a longitudinal speed that is a relative speed of the own vehicle in the traveling direction, for each target.

The target recognition section 11 fuses the target detected by the radar device 21 and the target detected by the imaging device 22 to generate a fusion target. Specifically, the target recognition section 11 specifies a longitudinal position of the fusion target on the basis of the distance and relative speed of the target detected by the radar device 21. Further, the target recognition section 11 specifies a lateral position of the fusion target on the basis of the lateral width and lateral position of the target detected by the imaging device 22. The target recognition section 11 performs pattern matching on the detection information of the target from the imaging device 22 (for example, performs processing of finding and classifying data that are identical or similar to a specific pattern from among a data group). As a result, the target recognition section 11 identifies a type of the detected target (for example, any of a vehicle, a pedestrian, and a bicycle).

The actuation timing calculation section 12 sets an actuation timing of the safety device as a timing to start driving assistance (assistance start timing) for avoiding collision between the own vehicle and the target or mitigating collision damage. Note that, in the present embodiment, the own vehicle includes a notification device 31 and a brake device 32 as the safety device.

The notification device 31 is, for example, a speaker or a display installed in a vehicle interior of the own vehicle. The notification device 31 outputs a predetermined alarm sound, alarm message, or the like on the basis of a control command from the driving assistance device 10. Thereby, the notification device 31 notifies a driver of immediate danger of collision between the own vehicle and the object (risk of collision). The brake device 32 is a braking device for braking the own vehicle. In the present embodiment, the driving assistance device 10 has a brake function as described below for avoiding collision between the own vehicle and the target or mitigating collision damage. Specifically, the driving assistance device 10 has a brake assist function for assisting the driver by increasing a braking force by a driver's brake operation, an automatic brake function for performing automatic braking in a case of no driver's brake operation, and the like. The brake device 32 performs a brake control by these functions on the basis of the control command from the driving assistance device 10. Note that, the driving assistance device 10 may further include, as a safety device, a seat belt device for pulling-in a seat belt provided for each seat of the own vehicle, a steering device for performing automatic steering, and the like.

The actuation timing is a predetermined value. The value of the actuation timing is stored, for example, in a predetermined storage area of a memory or the like (storage device) of the driving assistance device 10, and is acquired by being read from the storage area. In the present embodiment, the actuation timing calculation section 12 sets the actuation timing of the safety device according to a control content of driving assistance (hereinafter, referred to as "driving assistance content"). Specifically, the driving assistance device 10 has a function of executing, as a control of driving assistance, a first assistance control process of actuating the notification device 31, a second assistance control process of assisting a brake operation of the driver by the brake assist function, and a third assistance control process of performing automatic braking of the own vehicle by the automatic brake function. In this case, the actuation timing calculation section 12 sets, among these, an actuation timing of the first assistance control to the earliest timing, and sets an actuation timing of the third assistance control to the latest timing.

The actuation timing calculation section 12 sets the actuation timing to different values between a case where the collision avoidance operation was performed by the driver for avoiding collision between the target recognized by the target recognition section 11 and the own vehicle, and a case where the collision avoidance operation was not performed. The driver performs the collision avoidance operation, for example, such as a steering operation, for avoiding collision with a target existing in front of the own vehicle. If the safety device is actuated at this time, the driver may feel inconvenienced by the actuation of the safety device. Hence, the actuation timing calculation section 12 is configured as above.

Figure 2:
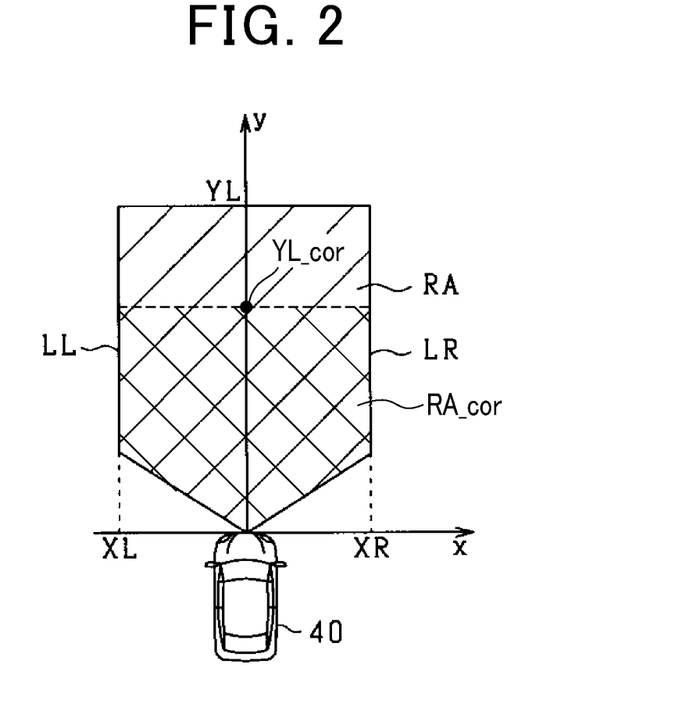
FIG. 2 is a diagram showing an actuation region of a safety device.

Specifically, the actuation timing calculation section 12, on the basis of the steering angle of the own vehicle, detects start of the collision avoidance operation by the driver for avoiding collision between the target and the own vehicle (determines whether the collision avoidance operation has been started). In a case where it is determined that the collision avoidance operation has not been started, the actuation timing calculation section 12 sets the actuation timing of the safety device to a predetermined reference timing TC1. On the other hand, in a case where it is determined that the collision avoidance operation has been started, the actuation timing calculation section 12 corrects the actuation timing of the safety device to a timing (hereinafter, referred to as a "delay timing TC2") which is later than the reference timing TC1. With this, in a status where the driver indicates an intention of collision avoidance, the safety device is actuated at a timing of having approached closer to the target (at a timing later than that in a status where the driver does not indicate the intention of collision avoidance). Note that, a condition for determining start of the collision avoidance operation may include a determination condition on the accelerator operation or brake operation of the driver other than a steering operation. As shown in FIG. 2, the actuation timing calculation section 12 calculates a length (depth) YL of an actuation region RA of the safety device on the basis of the set actuation timing and the relative speed of the target relative to an own vehicle 40.

The actuation determination section 13 determines whether to actuate the safety device, on the basis of the actuation timing. At this time, the actuation determination section 13 functions as the region setting section that sets the actuation region RA of the safety device. Specifically, the actuation determination section 13 sets the actuation region RA in front of the own vehicle 40 as a region sandwiched by a boundary line LL positioned leftwards of the own vehicle 40 and a boundary line LR positioned rightwards thereof.

More specifically, the actuation determination section 13 sets a right-side regulation value XR and a left-side regulation value XL as regulation values (hereinafter, referred to as "lateral position regulation values") in rightwards and leftwards (x-axis direction in FIG. 2) of a target as an actuation object of the safety device, respectively. The actuation region RA of the safety device is a region defined by the right-side regulation value XR, the left-side regulation value XL, and the length YL, and is set in front of the own vehicle 40 in the traveling direction (y-axis direction of FIG. 2). Note that, the left-side regulation value XL corresponds to a position of the boundary line LL in leftwards and the right-side regulation value XR corresponds to a position of the boundary line LR in rightwards. For example, in a case where the actuation timing is corrected to the delay timing TC2, the actuation determination section 13 (region setting section) corrects the length YL of the actuation region RA of the safety device to a position YL_cor closer to the own vehicle 40. Then, the actuation determination section 13 sets a region RA_cor defined by the right-side regulation value XR, the left-side regulation value XL, and the length YL_cor after the correction as an actuation region (corrects the actuation region).

The right-side regulation value XR and the left-side regulation value XL are variably set according to a type of a target, an estimated curve rate that is a curvature of a traveling path, a collision prediction time (TTC: Time to Collision), a relative speed of a target relative to the own vehicle 40, and the like. Specifically, as follows. For example, in a case where the target is a pedestrian, there is a possibility of sudden movement rightwards or leftwards (lateral direction), but in a case where the target is a preceding vehicle, there is only a small possibility of sudden movement in a lateral direction. In consideration of this point, in the case where the target is a preceding vehicle, a relatively small value is set to the right-side regulation value XR and the left-side regulation value XL compared with the case where the target is a pedestrian. The smaller the right-side regulation value XR is, the more a region width of the actuation region RA rightwards is reduced, and the smaller the left-side regulation value XL is, the more a region width of the actuation region RA leftwards is reduced. That is, in the case where the target is a preceding vehicle, the right and left region widths in the actuation region RA are reduced compared with the case of a pedestrian.

Further, for example, the sharper the curve of the traveling path is (the larger the curvature is), the lower the risk of collision between the obstacle existing outside the curve and the own vehicle 40 is. In consideration of this point, the larger the estimated curve rate (the curvature of the road) of the traveling path of the own vehicle 40 is, the smaller the value of the right-side regulation value XR and the smaller the value of the left-side regulation value XL are set to. Additionally, for example, the smaller the distance between the own vehicle 40 and the target is, the higher a detection precision of the radar device 21, the imaging device 22, and the like (target detection device) is. In consideration of this point, the shorter the TTC is, the smaller the value of the right-side regulation value XR and the smaller the value of the left-side regulation value XL are set to. Note that, the TTC is a time until the own vehicle 40 collides with the target. In addition, for example, the higher the speed (relative speed) at which the own vehicle 40 approaches the target, the smaller the operation amount of the steering operation (collision avoidance operation) by the driver for avoiding collision between the own vehicle 40 and the target. In consideration of this point, the higher the relative speed is, a smaller value is set to the right-side regulation value XR and the left-side regulation value XL.

In the present embodiment, a reduction rate of each of the right and left region widths in the actuation region RA is preliminarily set according to each parameter, such as a type of a target, an estimated curve rate, a TTC, and a relative speed of a target relative to the own vehicle 40. Specifically, the driving assistance device 10 holds data (for example, mapping data etc.) in which a reduction rate corresponding to a value of each parameter is preliminarily set, in a predetermined storage area, such as a memory. Thus, the actuation determination section 13 reads the reduction rate corresponding to the value of each parameter from the predetermined storage area to set the right-side regulation Value XR and the left-side regulation value XL by using the read-out reduction rate.

Figure 3:
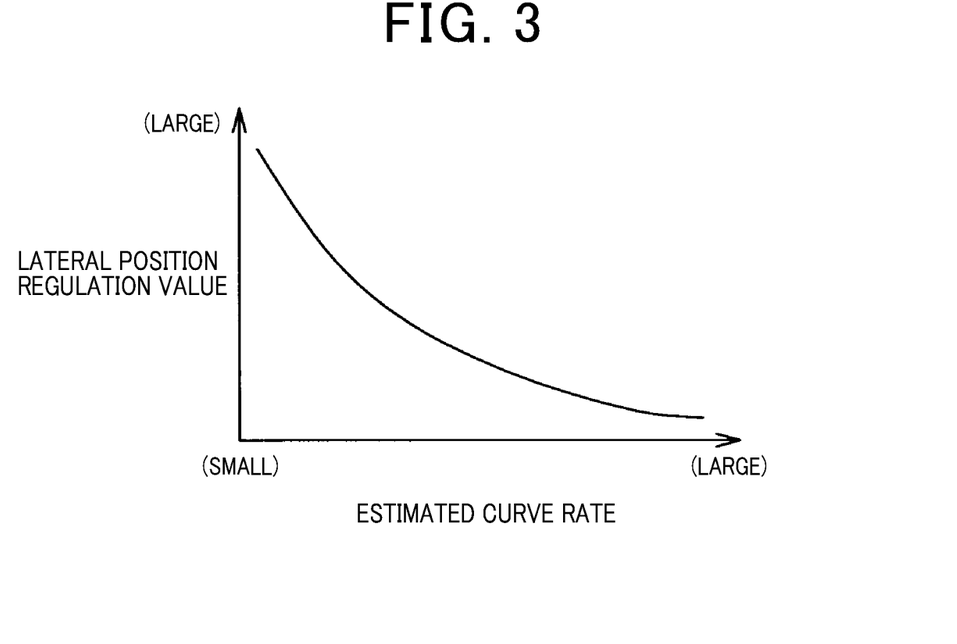
FIG. 3 is a graph showing a relation between an estimated curve rate and a lateral position regulation value.

FIG. 3 shows one example of a relation between an estimated curve rate and a lateral position regulation value. The estimated curve rate is, for example, calculated based on a yaw angle detected by the yaw rate sensor and an own Vehicle speed detected by the vehicle speed sensor. Note that, the calculation of the estimated curve rate is not limited to this method. The estimated curve rate may be calculated, for example, by use of image data. In addition, the estimated curve rate may be calculated based on a steering angle detected by the steering angle sensor and an own vehicle speed detected by the vehicle speed sensor. Note that, the estimated curve rate corresponds to information on a turning state (turning information) of the own vehicle 40.

The actuation determination section 13 calculates the TTC. The actuation determination section 13 calculates the TTC by dividing a lengthwise distance (relative distance in the traveling direction) between the target and the own vehicle 40 by the relative speed. Note that, the actuation determination section 13 may use a relative acceleration in addition to the relative speed to calculate the TTC by assuming that the own vehicle 40 approaches the target according to constant acceleration linear motion. The actuation determination section 13 determines whether the lateral position of the target recognized by the target recognition section 11 is within the range of the lateral position regulation value (within the range of the right-side regulation value XR and the left-side regulation value XL) and whether the TTC has reached the actuation timing. With this, the actuation determination section 13 determines whether the target is within the actuation region RA of the safety device. As a result, the actuation determination section 13, in a case of having determined that the target is within the actuation region RA, outputs a signal indicating the determination result to the control processing section 14. In the present embodiment, the actuation determination section 13 performs determination on whether the target is within the actuation region RA for each of the target detected by the radar device 21, the target detected by the imaging device 22, and the fusion target. That is, in the present embodiment, the actuation determination section 13 determines whether all the targets are within the actuation region RA, and in a case where they are within the region, transmits a signal of the determination result to the control processing section 14.

The control processing section 14, when having received from the actuation determination section 13 a signal indicating that the target is within the actuation region RA, transmits a control command to the notification device 31 or the brake device 32. With this, in the present embodiment, the safety device is actuated based on the control command, and the control of driving assistance, such as an alarm by the notification device 31 to the driver, or a brake control by the brake device 32, is performed.

Here, in a state in which the own vehicle 40 is turning, for example, while traveling on a curved road (hereinafter, referred to as a "curved road"), a target existing outside in the turning direction (in an out-of-path direction) of the own vehicle 40 is erroneously determined as the actuation object of the safety device. As a result, regardless of there being no possibility of collision, there is a tear that the safety device is actuated (unnecessary actuation of the safety device occurs). To reduce or prevent such an unnecessary actuation, in a state in which the own vehicle 40 is turning, a method can be considered which reduces the actuation region RA of the safety device on the curved road, so that the method excludes from the actuation object of the safety device the target existing outside in the turning direction of the own vehicle 40. However, in a case of wholly reducing the actuation region RA for preventing the unnecessary actuation of the safety device, regardless of possibility of collision, the safety device is less likely to be actuated for the target existing inside in the turning direction (in the traveling direction) of the own vehicle 40.

Therefore, in the case where the own vehicle 40 is in the turning state, the driving assistance device 10 of the present embodiment performs a control as follows to the actuation region RA of the safety device. Specifically, the driving assistance device 10 changes a lateral position of a boundary line in the out-of-path direction (outside in the turning direction) of the own vehicle 40, of the left and right boundary lines LL, LR of the actuation region RA, to a position closer to the own vehicle 40 according to the estimated curve rate (turning information). On the other hand, for a boundary line in the traveling direction (inside in the turning direction) of the own vehicle 40, the driving assistance device 10 does not change the lateral position of the boundary line according to the estimated curve rate. The driving assistance device 10, with such a configuration, performs a one-side control of reducing the actuation region RA of the safety device.

The driving assistance device 10 changes the left and right boundary lines LL, LR to positions closer to the own vehicle 40 according to the estimated curve rate. Consequently, the driving assistance device 10 performs, by changing according to the traveling status of the own vehicle 40, the one-side control and a both-side control of reducing the actuation region RA. In the present embodiment, in the traveling status of the own vehicle 40, the following status is set to an execution condition of the one-side control. Specifically, the execution condition includes a condition that the own vehicle 40 is traveling on the curved road or traveling unsteadily (meandering). The driving assistance device 10 performs the one-side control in a case where the execution condition is satisfied (in a case of traveling on the curved road or traveling unsteadily), and performs the both-side control in a case where it is not satisfied. As described above, the driving assistance device 10 of the present embodiment reduces the actuation region RA of the safety device. At this time, the actuation determination section 13 functions as a status determination section that determines, as the traveling status of the own vehicle 40, whether the own vehicle 40 is traveling on the curved road or whether the own vehicle 40 is traveling unsteadily.

Figure 4:
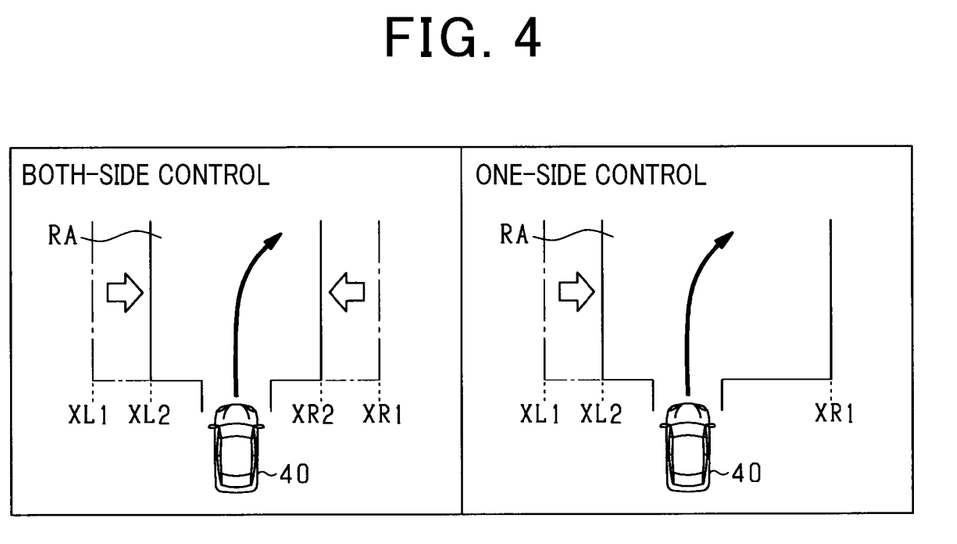
FIG. 4 is a diagram showing actuation regions set by a one-side control and a both-side control, respectively.

FIG. 4 shows one example of an actuation region RA (a specific aspect in a case of reducing the actuation region RA) set by each of the both-side control and the one-side control. Note that, the example shown in FIG. 4 assumes a case where the own vehicle 40 is turning to the right. As shown in FIG. 4, the both-side control changes the left-side regulation value XL from XL1 to XL2 (XL1>XL2) along with increase of the estimated curve rate. Further, it changes the right-side regulation value XR from XR1 to XR2 (XR1>XR2). That is, the both-side control changes the left and right boundary lines LL, LR of the actuation region RA to positions closer to the own vehicle 40. With this, the both-side control narrows the region widths on both left and right sides to reduce the actuation region RA.

On the other hand, the one-side control changes the left-side regulation value XL that is the lateral position regulation value in the out-of-path direction (outside in the turning direction) of the own vehicle 40 from XL1 to XL2 (XL1>XL2) along with increase of the estimated curve rate. Whereas, the one-side control keeps (does not change) XR1 for the right-side regulation value XR that is the lateral position regulation value in the traveling direction (inside in the turning direction) of the own vehicle 40. That is, the one-side control changes the left and right boundary lines LL, LR of the actuation region RA to positions closer to the own vehicle 40. With this, the one-side control narrows the region width of either the left or right sides to reduce the actuation region RA.

Figure 5:
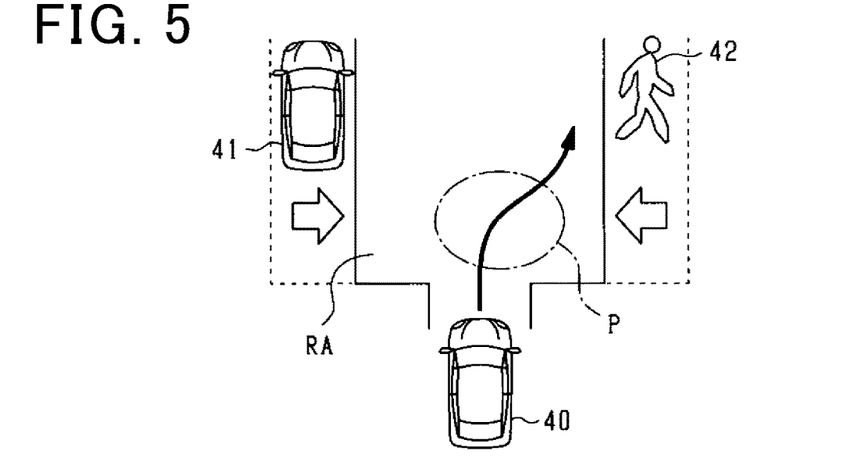
FIG. 5 is a diagram showing an actuation region in a case Where a collision avoidance operation has been performed.

Here, it is assumed that when the own vehicle 40 avoided collision by turning around an obstacle existing on a side of the vehicle, still another obstacle exists in a path ahead. At this time, it is assumed that the actuation region RA on the traveling direction side of the own vehicle 40 is kept without being reduced (kept wide). In such a case, the obstacle existing in the traveling direction tends to be determined to be an actuation object of the safety device. Hence, there is a possibility of causing unnecessary actuation of the safety device. For example, as shown in FIG. 5, a case is considered in which the driver of the own vehicle 40 operates the steering wheel rightwards for avoiding collision with a parked vehicle 41 existing on the left side of the own vehicle 40 (a case where the own vehicle 40 turned in rightwards). In this case, it is assumed that a steering wheel operation P for collision avoidance is determined to be an unsteady traveling, and the right boundary line LR of the actuation region RA is not changed to a position closer to the own vehicle 40. In such a case, the target existing in the path ahead of the own vehicle 40 (a pedestrian 42 in FIG. 5) is determined to be the actuation object of the safety device. As a result, it is considered that is regardless of there being no possibility of collision with the target, the safety device may be actuated (unnecessary actuation of the safety device occurs).

Therefore, in the driving assistance device 10 of the present embodiment, the actuation determination section 13 performs the following processing. Specifically, the actuation determination section 13 determines start of a collision avoidance operation (steering operation) by the driver for avoiding collision between the target recognized by the target recognition section 11 and the own vehicle 40 on the basis of information on a traveling status (for example, traveling status information, such as a steering angle and a steering angular speed) included in the turning information of the own vehicle 40. The actuation determination section 13, in a case of having determined that the collision avoidance operation has been started, reduces the actuation region RA by the both-side control. At this time, the actuation determination section 13 performs the both-side control under the condition that a second target different from a first target which was the object of the collision avoidance operation is recognized by the target recognition section 11 in the traveling direction of the own vehicle 40 after the collision avoidance operation has been started by the driver, and the second target is a target belonging to one of predetermined types. As described above, the actuation determination section 13 functions as an operation determination section that determines, on the basis of the turning information, start of the collision avoidance operation by the driver for avoiding collision between the target recognized by the target recognition section 11 and the own vehicle 40. Further, the actuation determination section 13, in a case where it is determined that the collision avoidance operation by the driver has been started, functions as a type determination section that determines whether the target is recognized by the target recognition section 11 in the traveling direction of the own vehicle 40 and whether the recognized target is a target belonging to one of predetermined types.

Next, a processing procedure of a driving assistance control executed by the driving assistance device 10 of the present embodiment will be described with reference to flowcharts in FIG. 6 and FIG. 7, This processing is executed according to a predetermined control cycle, and executed for each target existing in front of the own vehicle 40 in the traveling direction.

Figure 6:
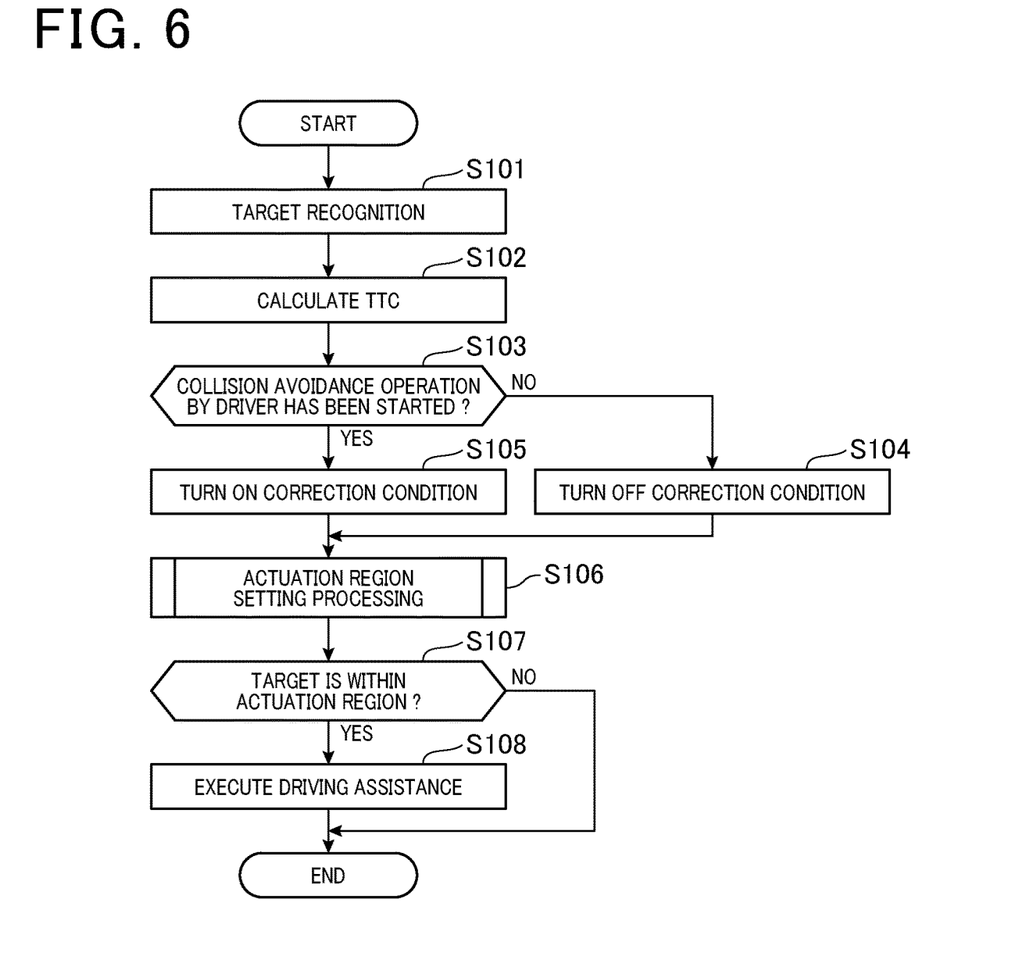
FIG. 6 is a flowchart showing a processing procedure of a driving assistance control.

As shown in FIG. 6, the driving assistance device 10 performs target recognition by using detection information of the target from the radar device 21 and detection information of the target from the imaging device 22 (step S101). The driving assistance device 10 calculates a TTC for each recognized target (step S102). The driving assistance device 10 determines whether the collision avoidance operation by the driver has been started to the recognized target (step S103). Here, it is determined whether a change amount Δθ of a steering angle detected by the steering angle sensor is not less than a predetermined value. Note that, the determination of start of the collision avoidance operation by the driver is not limited to a method based on a change amount Δθ of a steering angle. For example, it may be determined based on whether the steering angle is not less than a predetermined value.

The driving assistance device 10, in a case where it is determined that the collision avoidance operation by the driver has not been started (step S103: NO), turns off a correction condition of the actuation timing of the safety device (step S104). On the other hand, the driving assistance device 10, in a case where it is determined that the collision avoidance operation by the driver has been started (step S103: YES), turns on a correction condition of the actuation timing of the safety device (step S105).

Figure 7:
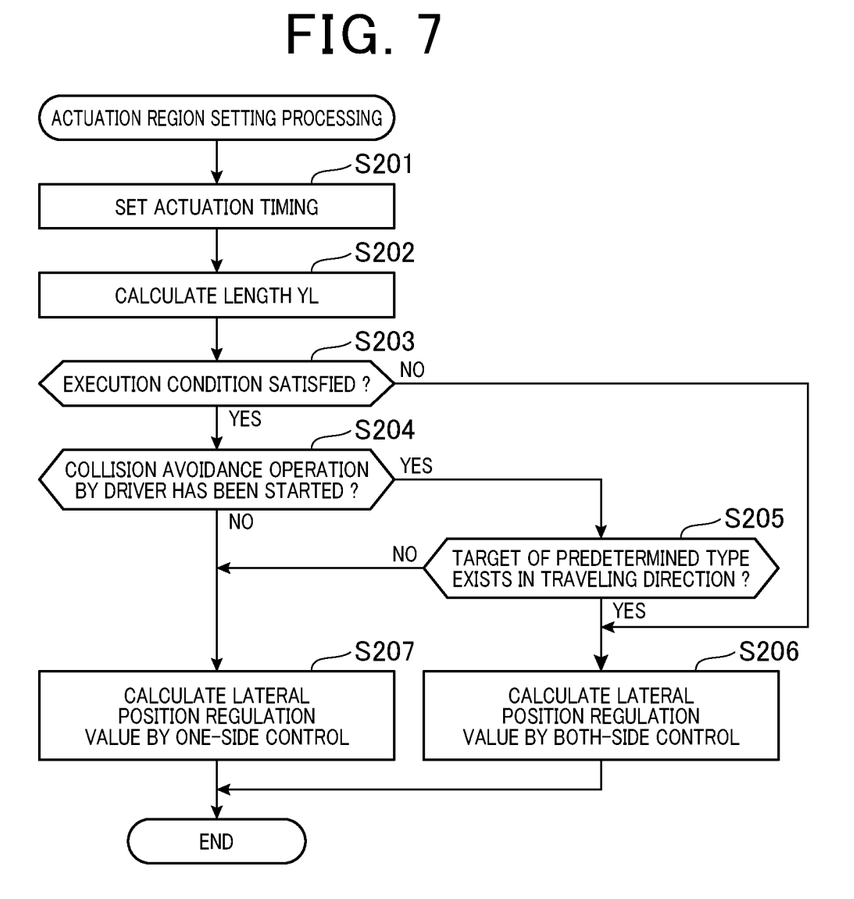
FIG. 7 is a flowchart showing a process procedure of an actuation region setting.

The driving assistance device 10 executes actuation region setting processing shown in FIG. 7 to set the actuation region RA of the safety device (step S106). The driving assistance device 10 determines whether a position of the recognized target is within the actuation region RA (whether the target has entered the actuation region RA) (step S107). The driving assistance device 10, in a case where it is determined that the position of the target is within the actuation region RA (the target has entered the actuation region RA) (step S107: YES), transmits a control command (drive signal) to the safety device, and executes the driving assistance (step S108). After that, a series of processing is ended. On the other hand, the driving assistance device 10, in a case where it is determined that the position of the target is not within the actuation region RA (the target has not entered the actuation region RA) (step S107: NO), does not execute the driving assistance and ends a series of processing.

Next, the actuation region setting processing executed in the step S106 will be described with reference to FIG. 7. As shown in FIG. 7, the driving assistance device 10 sets the actuation timing of the safety device (step S201). Here, the driving assistance device 10 sets the actuation timing as follows. Specifically, the driving assistance device 10 reads a reference timing TC1 preliminarily stored in a predetermined storage area, such as a memory. In a case where the correction condition of the actuation timing is OFF, the driving assistance device 10 sets the read-out reference timing TC1 as the actuation timing. On the other hand, in a case where the correction condition is ON, the driving assistance device 10 performs correction to delay the read-out reference timing TC1 to obtain a delay timing TC2. Then, the driving assistance device 10 sets the delay timing TC2 as the actuation timing.

The driving assistance device 10 calculates the length YL of the actuation region RA of the safety device on the basis of the set actuation timing and the relative speed of the target relative to the own vehicle 40 (step S202). The driving assistance device 10 determines whether the execution condition of the one-side control is satisfied (step S203). Here, the driving assistance device 10 determines whether the own vehicle 40 is traveling on the curved road or Whether the own vehicle 40 is traveling unsteadily. As a result, in a case where it is determined that the own vehicle 40 is traveling on the curved road or traveling unsteadily, the driving assistance device 10 makes an affirmative determination that the execution condition of the one-side control is satisfied. On the other hand, in a case where it is determined that the own vehicle 40 is not traveling on the curved road and not traveling unsteadily, the driving assistance device 10 makes a negative determination that the execution condition of the one-side control is not satisfied.

As to whether the own vehicle 40 is traveling on the curved road, the determination is made as follows. The driving assistance device 10 extracts a traveling dividing line, such as a white line, drawn on the road in front of the own vehicle 40 in the traveling direction, for example, from image data acquired from the imaging device 22, and calculates a curvature of the extracted traveling dividing line. Then, the driving assistance device 10 determines whether the traveling dividing line is a straight line or a curved line, on the basis of the calculated curvature. As a result, in a case where the traveling dividing line is determined to be a straight line, the driving assistance device 10 determines that the own vehicle 40 is traveling on the straight road. On the other hand, in a case where the traveling dividing line is determined to be a curved line, the driving assistance device 10 determines that the own vehicle 40 is traveling on the curved road. Note that, the determination on whether the own vehicle 40 is traveling on the curved road is not limited to a method based on the traveling dividing line. For example, the driving assistance device 10 may make a determination by using information acquired from a GNSS receiver (not illustrated) mounted in the own vehicle 40. In addition, the driving assistance device 10 may detect, by the radar device 21, positions of a plurality of places of a road structure, such as a guard rail, and make a determination on the basis of the detected positions.

As to whether the own vehicle 40 is traveling unsteadily, the determination is made as follows. The driving assistance device 10 detects an acceleration in the turning direction of the own vehicle 40 by using, for example, the yaw rate sensor, and makes a determination on the basis of the detected acceleration. Note that, the determination on whether the own vehicle 40 is traveling unsteadily is not limited to a method based on the detection value of the yaw rate sensor. For example, the driving assistance device 10 calculates a lateral moving amount (moving amount in the lateral direction) during traveling from a traveling track of the vehicle by using, for example, image data. Then, the driving assistance device 10 may compare a threshold with the calculated lateral moving amount and make a determination on the basis of the comparison result.

The driving assistance device 10, in a case where it is determined that the execution condition of the one-side control is not satisfied (step S203: NO), selects the both-side control and calculates the lateral position regulation values (the right-side regulation value XR and left-side regulation value XL) (step S206). Specifically, the driving assistance device 10 acquires a current estimated curve rate, a TTC, a relative speed of the target relative to the own vehicle 40, and information on a type of the recognized target, respectively. Then, the driving assistance device 10 reads reduction rates of the right and left region widths in the actuation region RA according to the each acquired information (each parameter) from a predetermined storage area (mapping data), such as a memory. The driving assistance device 10 calculates the right-side regulation value XR and left-side regulation value XL (values after reduction) on the basis of the read-out reduction rates. On the other hand, the driving assistance device 10, in a case where it is determined that the execution condition of the one-side control is satisfied (step S203: YES), determines whether the collision avoidance operation by the driver has been started to the recognized target (step S204). Here, the driving assistance device 10 compares a threshold with at least one value of the steering angle and the steering angular speed, and determines the start of the collision avoidance operation by the driver on the basis of the comparison result.

Figure 8:
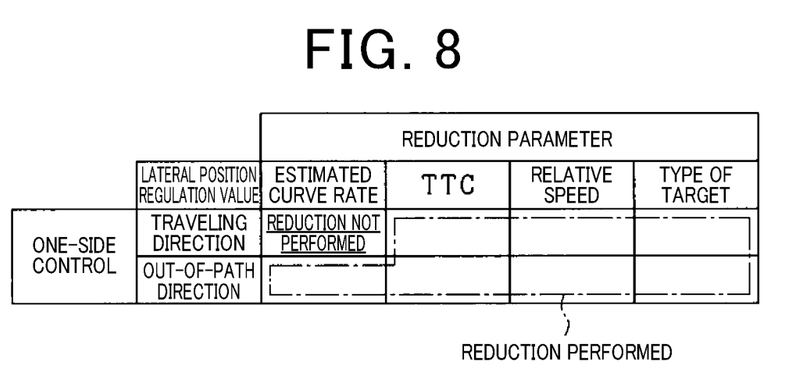
FIG. 8 is a diagram showing a relation between reduction performed/not performed of a lateral position regulation value and a reduction parameter.

The driving assistance device 10, in a case Where it is determined that the collision avoidance operation by the driver has not been started (step S204: NO), selects the one-side control and calculates the lateral position regulation value (step S207). Specifically, the driving assistance device 10 acquires a current estimated curve rate, a TTC, a relative speed of the target relative to the own vehicle 40, and information on a type of the recognized target, respectively. Then, the driving assistance device 10 reads reduction rates of the right and left region widths in the actuation region RA according to the each acquired information (each parameter) from a predetermined storage area, such as a memory. The driving assistance device 10 calculates the lateral position regulation value (value after reduction) in the out-of-path direction (outside in the turning direction) of the own vehicle 40 of the right-side regulation value XR and left-side regulation value XL on the basis of the read-out reduction rates. In addition, the driving assistance device 10 calculates the lateral position regulation value in the traveling direction (inside in the turning direction) of the own vehicle 40 by using the reduction rate according to an parameter (a TTC, a relative speed of the target relative to the own vehicle 40, and information on a type of the target) different from the estimated curve rate of the read-out reduction rates. That is, in a case where it is determined that the collision avoidance operation by the driver has not been started, the driving assistance device 10 does not calculate the lateral position regulation value in the traveling direction of the own vehicle 40 by using the reduction rate according to the estimated curve rate. Therefore, the driving assistance device 10 does not change the lateral position of the boundary line according to the estimated curve rate. FIG. 8 shows one example of reduction performed/not performed of the actuation region RA by the one-side control in the traveling direction and in the out-of-path direction of the own vehicle 40. Additionally, FIG. 8 shows the reduction performed/not performed for each reduction parameter. As shown in FIG. 8, in the one-side control of the present embodiment, the reduction is not performed only on the estimated curve rate that is one of the reduction parameters in the traveling direction of the own vehicle 40, and the reduction is performed on the other reduction parameters. In addition, the reduction is performed on all the reduction parameters in the out-of-path direction of the own vehicle 40.

The driving assistance device 10, in a case where it is determined that the collision avoidance operation by the driver has been started (step S204: YES), determines whether the target is recognized in the traveling direction of the own vehicle 40 and whether the recognized target is a target belonging to one of predetermined types (step S205). That is, in a case where it is determined that the collision avoidance operation by the driver has been started, the driving assistance device 10 determines whether the target of the predetermined type exists in the traveling direction of the own vehicle 40. Here, in a case where the target recognized in the traveling direction of the own vehicle 40 is recognized as at least one of a vehicle, a pedestrian, and a bicycle, the driving assistance device 10 makes an affirmative determination that the target of the predetermined type exists in the traveling direction of the own vehicle 40.

The driving assistance device 10, in a case where it is determined that the target of the predetermined type exists in the traveling direction of the own vehicle 40 (step S205: YES), calculates the lateral position regulation values by the both-side control (step S206), and ends the processing. On the other hand, the driving assistance device 10, in a case where it is determined that the target of the predetermined type does not exist in the traveling direction of the own vehicle 40 (step S205: NO), calculates the lateral position regulation value by the one-side control (step S207), and ends the processing.

The driving assistance device 10 of the present embodiment described above in detail can obtain excellent effects described below.

In a case where the own vehicle 40 is in a turning state, a configuration is used which changes the lateral position (lateral position regulation value) of the boundary line in the out-of-path direction (outside in the turning direction) of the own vehicle 40, of the left and right boundary lines LL, LR of the actuation region RA, to a position closer to the own vehicle 40 according to the estimated curve rate (turning information). In the driving assistance device 10 of the present embodiment, with the above configuration, for example, during traveling on the curved road, the safety device is made less likely to be actuated for the target existing outside in the turning curve out-of-path direction) of the own vehicle 40. With this, in the driving assistance device 10, it is possible to prevent unnecessary actuation of the safety device from being performed on a target having no possibility of collision (a target having a low risk of collision) (it is possible to prevent unnecessary driving assistance from being performed).

In addition, in a case where the own vehicle 40 is in the turning state, as to the lateral position of the boundary line in the traveling direction (inside in the turning direction) of the own vehicle 40, of the left and right boundary lines LR of the actuation region RA, a configuration is used which does not change the lateral position of the boundary line according to the estimated curve rate. In the driving assistance device 10 of the present embodiment, with such a configuration, for example, during traveling on the curved road, the safety device is made more likely to be actuated to the target existing inside in the turning curve (traveling direction) of the own vehicle 40. With this, in the driving assistance device 10, it is possible to prevent actuation delay of the safety device to the target existing inside in the turning direction of the own vehicle 40 (it is possible to perform driving assistance at an appropriate timing). Therefore, in the driving assistance device 10 of the present embodiment, it is possible to prevent unnecessary actuation of the safety device from being performed on a target having no possibility of collision (a lateral target that is likely to be subjected to unnecessary driving assistance), and to start actuation of the safety device at an appropriate timing to a target having a possibility of collision.

In the driving assistance device 10 of the present embodiment, a configuration is used which reduces the actuation region RA by changing, according to the traveling status of the own vehicle 40, the both-side control of changing positions of the left and right boundary lines of the actuation region RA and the one-side control of changing the position of one of the left and right boundary lines. With this, in the driving assistance device 10, it is possible to realize both prevention of unnecessary actuation and prevention of actuation delay of the safety device, according to the traveling status of the own vehicle 40. That is, in the driving assistance device 10, it is possible to perform appropriate driving assistance according to the traveling status of the own vehicle 40.

In the driving assistance device 10 of the present embodiment, a configuration is used Which performs the one-side control under the condition that it is determined that the own vehicle 40 is traveling on the curved road or traveling unsteadily (meandering). In such a traveling status, the driving assistance is less likely to be performed on the target existing outside in the turning direction of the own vehicle 40, and the start delay of driving assistance is easy to occur to the target existing inside in the turning direction of the own vehicle 40. On the other hand, in a status in which the own vehicle 40 is traveling straight on a straight road, the possibility of collision with the lateral target of the own vehicle 40 is almost the same between both of the right and left sides of the actuation region RA. In this light, the driving assistance device 10 performs the one-side control in a case where the own vehicle 40 is in the specific traveling status as describe above. With this, in the driving assistance device 10, it is possible to prevent driving assistance from being performed on the lateral target that is likely to be subjected to unnecessary driving assistance, and to perform driving assistance at an appropriate timing on a target having a possibility of collision.

In the driving assistance device 10 of the present embodiment, in a case where it is determined that the collision avoidance operation by the driver has been started, a configuration is used which reduces the actuation region RA by the both-side control. In a case Where the actuation region RA on the traveling direction side of the own vehicle 40 is kept without being reduced (kept wide), for example, it is assumed that the driver performs the steering wheel operation P for avoiding collision with the parked vehicle 41 and another target exists in the path ahead. In such a status, regardless of the low risk of collision with the other target, there is a fear that the safety device is actuated. In this light, the driving assistance device 10 can prevent unnecessary actuation of the safety device, with the above configuration, even in a case where the collision avoidance operation by the driver has been started.

In the driving assistance device 10 of the present embodiment, a configuration is used which reduces the actuation region RA by the both-side control, along with start of the collision avoidance operation by the driver. At this time, in the driving assistance device 10, a configuration is used which reduces the actuation region RA by the both-side control, under the condition that the second target different from the first target existing in the same traveling direction as that of the own vehicle 40 is a target (for example, a vehicle, a pedestrian, or a bicycle) belonging to a specific type. If the safety device is actuated regardless of there being no possibility of collision with a vehicle, a pedestrian, or a bicycle, it is considered that the driver may feel uneasy or feel impatience due to the actuation of the safety device. In this regard, the driving assistance device 10 can perform appropriate driving assistance with the above configuration.

In the driving assistance device 10 of the present embodiment, in a case of reducing the actuation region RA by the one-side control, for parameters (for example, a TTC, a relative speed, and information on a type of the target) different from the estimated curve rate, a configuration is used which reduces the right and left region widths of the actuation region RA by using a reduction rate corresponding to each parameter as in the both-side control. With this, in the driving assistance device 10, it is possible to appropriately set the actuation region RA according to the traveling state.

Other Embodiments

The technology of the present disclosure may be implemented, for example, as follows without being limited to the above embodiment.

The above embodiment used the estimated curve rate as the information (turning information) on the turning state of the own vehicle 40, but not limited to this. As the turning information, for example, a steering angle or a yaw rate of the own vehicle 40 may be used.

The above embodiment used a configuration which performs the one-side control under the condition that it is determined that the own vehicle 40 is traveling on the curved road or traveling unsteadily, but not limited to this. In the driving assistance device 10, the actuation region RA may be set by the one-side control regardless of whether the execution condition of the one-side control is satisfied.

The above embodiment determines whether the target is within the actuation region RA for each of the target detected by the radar device 21, the target detected by the imaging device 22, and the fusion target. Then, the above embodiment used a configuration which actuates the safety device in a case where it is determined that all the targets have entered the actuation region RA, but it is not limited to this. The driving assistance device 10, for example, determines whether a part of at least one of the target detected by the radar device 21, the target detected by the imaging device 22, and the fusion target is within the actuation region RA. Then, the driving assistance device 10 may actuate the safety device in a case where a part of at least one of the target detected by the radar device 21, the target detected by the imaging device 22, and the fusion target has entered the actuation region RA.

The driving assistance device 10 determines whether a rate of the turning of the own vehicle 40 rightwards or leftwards has changed to an increasing trend. Then, in a case of affirmative determination, the driving assistance device 10 may determine that the own vehicle 40 is in a turning state and reduce the actuation region RA by the one-side control. In addition, the driving assistance device 10, in a case where the turning amount of the own vehicle 40 rightwards or leftwards has reached a predetermined value or more, may determine that the own vehicle 40 is in a turning state and reduce the actuation region RA by the one-side control.

The above embodiment described a case of avoiding collision with an obstacle existing in front of a vehicle when the vehicle is moving forward, but not limited to this. For example, when the vehicle is moving backward, the embodiment may be applied to a system Which avoids collision with an obstacle by detecting an obstacle existing at the rear of the vehicle. Note that, "in front of a vehicle" means a front direction of the vehicle when the vehicle is moving forward and means a rear direction of the vehicle when the vehicle is moving backward.

The above respective components are conceptual and not limited to the above embodiments. For example, a function of one component may be realized by being distributed to a plurality of components, or a function of a plurality of components may be realized by one component.

REFERENCE SIGNS LIST

10 . . . Driving assistance device, 11 . . . Target recognition section, 12 . . . Actuation timing calculation section, 13 . . . Actuation determination section, 14 . . . Control processing section, 21 . . . Radar device, 22 . . . Imaging device, 31 . . . Notification device, 32 . . . Brake device, 40 . . . Own vehicle

The invention claimed is:

1. A driving assistance device communicable to a sensor which is an object detecting device for detecting a target existing around an own vehicle, comprising:
   a memory;
   a processor communicable to the memory; and
   a set of computer-executable instructions stored on the memory that cause the processor to implement:
   recognizing the target existing around the own vehicle, based on a detection result of the target, the detection result which is acquired from the sensor;
   setting, in front of the own vehicle, a front region that is a region sandwiched by left and right boundary lines positioned leftwards and rightwards of the own vehicle, respectively; and
   performing driving assistance for avoiding collision between the own vehicle and the target or for mitigating collision damage, in a case where the recognized target enters the front region, wherein
   the processor, in a case where the own vehicle is in a turning state, performs a one-side control of reducing the front region by changing a lateral position of a boundary line in an outside in a turning direction of the own vehicle, of the left and right boundary lines of the front region, to a position closer to the own vehicle according to turning information that is information on the turning state of the own vehicle, and for a boundary line in an inside in a turning direction of the own vehicle, by not changing of a lateral position according to the turning information.

2. The driving assistance device according to claim 1, wherein
the processor performs, by changing according to a traveling status of the own vehicle, the one-side control and a both-side control of reducing the front region, by changing lateral positions of the left and right boundary lines on both left and right sides of the front region to positions closer to the own vehicle according to the turning information.

3. The driving assistance device according to claim 2, further comprising:
the set of computer-executable instructions that cause the processor to implement:
determining, as the traveling status of the own vehicle, whether the own vehicle is traveling on a curved road or whether the own vehicle is traveling unsteadily, wherein
the processor performs the one-side control, in a case where it is determined that the own vehicle is traveling on the curved road or traveling unsteadily.

4. The driving assistance device according to claim 1, further comprising:
the set of computer-executable instructions that cause the processor to implement:
determining start of a collision avoidance operation by a driver for avoiding collision between the recognized target and the own vehicle, on a basis of the turning information, wherein
the processor, in a case where it is determined that the collision avoidance operation has been started, performs a both-side control of reducing the front region by changing lateral positions of the left and right boundary lines on both left and right sides of the front region to positions closer to the own vehicle according to the turning information.

5. The driving assistance device according to claim 4, further comprising:
the set of computer-executable instructions that cause the processor to implement:
determining, in a case where it is determined that the collision avoidance operation has been started, whether the target is recognized in a traveling direction of the own vehicle and whether the recognized target is a target belonging to one of predetermined types, wherein
section the processor reduces the front region by the both-side control, in a case where it is determined that the collision avoidance operation has been started under a condition that it is determined that the target is a target belonging to one of the predetermined types.

6. The driving assistance device according to claim 1, wherein
the turning information and other information different from the turning information are specified as a parameter for reducing the front region and
the one-side control changes a lateral position of a boundary line in the outside in a turning direction of the own vehicle of the left and right boundary lines of the front region according to the turning information and the other information, and changes a lateral position of a boundary line in the inside in a turning direction of the own vehicle according to the other information.

7. The driving assistance device according to claim 1, wherein
the own vehicle mounts a radar device and an imaging device as target detecting devices to detect the target, and
the processor performs the driving assistance, in a case where at least one of targets detected by the radar device, a target detected by the imaging device, and a target recognized by fusing detection information of the radar device and detection information of the imaging device, has entered the front region.

8. A driving assistance method in a driving assistance device, comprising:
a target recognition step of recognizing a target existing around an own vehicle;
a region setting step of setting, in front of the own vehicle in a traveling direction, a front region that is a region sandwiched by left and right boundary lines positioned on a left side and on a right side of the own vehicle, respectively; and
a control step of performing driving assistance for avoiding collision between the own vehicle and the target or for mitigating collision damage, in a case where the target recognized by the target recognition step enters the front region, wherein
the region setting step, in a case where the own vehicle is in a turning state, performs a one-side control of reducing the front region by changing a lateral position of a boundary line in an outside in a turning direction of the own vehicle, of the left and right boundary lines of the front region, to a position closer to the own vehicle according to turning information that is information on the turning state of the own vehicle, and for a boundary line in an inside in a turning direction of the own vehicle, by not changing of a lateral position according to the turning information.

* * * * *